PERSING & PEASE.
Coffee Pot.
No. 90,387. Patented May 25, 1869.
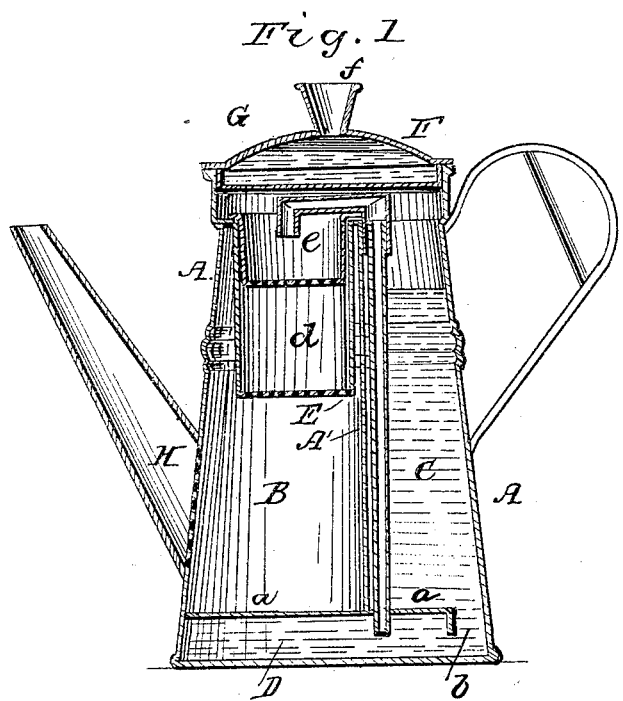
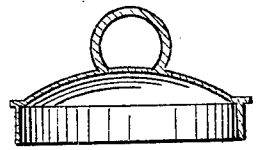
Witnesses
Inventors

United States Patent Office.

H. W. PERSING AND J. F. PEASE, OF CHICAGO, ILLINOIS.

*Letters Patent No. 90,387, dated May 25, 1869.*

APPARATUS FOR MAKING TEA AND COFFEE.

*The Schedule referred to in these Letters Patent and making part of the same.*

*To all whom it may concern:*

Be it known that we, H. W. PERSING and J. F. PEASE, of Chicago, in the county of Cook, and State of Illinois, have invented a new and improved Apparatus for Making Tea and Coffee; and we do hereby declare that the following is a full, clear, and exact description thereof, reference being had to the annexed drawings, making part of this specification, in which—

Figure 1 is an upright sectional view, and

Figure 2 is a view of the cover of our improved apparatus.

Like letters in the drawings refer to like parts.

The object of this invention is to provide an apparatus for making tea or coffee, by which the full strength of such tea or coffee may be extracted, and prevented from escaping, as in the ordinary processes, consequently requiring less material, producing a better beverage, and with more facility than by any known method; and it consists in the combination and arrangement of a number of devices, which, together, operate to effect the desired result.

To enable others skilled in the art to make and use our improved apparatus, we will proceed to describe its construction and operation.

The vessel may be constructed of any desired material, suitable for such purpose, and of any desired form or size.

In the drawings—

A represents the outward form of an ordinary coffee-pot.

A' is a partition which divides the vessel into two apartments, viz, B C.

$a\ a$ is an inner bottom, three-fourths to an inch from the outer bottom, having flange $b$, which flange extends downward nearly to the outer bottom, making another small apartment D, communicating with apartment C, as shown at $c$.

E is a pipe, from three-sixteenths to five-sixteenths inch in diameter, the lower end of which passes down through to one-quarter inch below the inner bottom $a\ a$, into apartment D, and extends upward to, and is bent over the top of the partition A'.

$d$ is a filter or percolator, with perforated bottom, to hold the coffee or tea.

$e$ is a water-distributer, also with a perforated bottom, which sets into and over the percolator, so that the water may be evenly distributed over the coffee or tea in the percolator below, said distributer and percolator being placed directly under the mouth of the pipe E.

The bent portion of the pipe is made removable, in order that the percolator may be removed when desired.

F is a cover, constructed with a chamber, $g$, inside, to hold cold water to act as a condenser, and has funnel-shaped opening, $f$, or an ordinary cover, as represented in fig. 2, may be used.

The operation of the apparatus is as follows:

Take the required quantity of ground coffee or tea to make the amount desired, put it into the percolator $d$, put on the distributer, and put the percolator into its proper place, also the removable portion of the pipe E; then pour sufficient boiling water to thoroughly moisten or wet through the coffee or tea in the percolator.

Next pour into the apartment C sufficient water to make the amount of tea or coffee required.

Now set the vessel on a hot stove, or over a fire. The water will soon begin to boil in the apartment D, and will be forced by steam through the tube E, into the water-distributer $e$, from whence it will be evenly distributed over the surface of the coffee or tea in the percolator $d$, and passing through, carry with it the full strength of such coffee or tea into the apartment B, giving perfectly clear coffee or tea, which will be kept hot by the boiling water in apartment D and pipe E, and not boil itself, which is of the utmost importance, for when coffee or tea is allowed to boil, much of the flavor or strength of the same escapes by evaporation.

Another advantage is, that perfectly clear coffee is produced by this apparatus, without having recourse to any of the various substances used for settling coffee, such as egg, isinglass, &c.

We are aware that coffee and teapots have been used that were formed of several different apartments, and having pipes through which the water is forced by the pressure of steam, but such construction of tea and coffee-pots was not like ours.

Having thus described our invention,

What we claim, and desire to secure by Letters Patent, is—

The combination of the pipe E, water-distributer $e$, percolator $d$, with the coffee-pot A, having partition A', inner bottom $a\ a$, having flange $b$, with hole $c$, all constructed and arranged to operate in the manner and for the purpose described.

H. W. PERSING.
J. F. PEASE.

Witnesses:
D. C. McLEAN,
A. L. J. ANDREWS.